United States Patent [19]

Nakagawa et al.

[11] Patent Number: 4,648,785
[45] Date of Patent: Mar. 10, 1987

[54] INDUSTRIAL ROBOT EMPLOYING DIRECT DRIVE OPERATION

[75] Inventors: Tohru Nakagawa; Yasuo Sakurai; Yoshiaki Makizawa, all of Osaka, Japan

[73] Assignee: Matsushita Electric Industrial Co., Ltd., Japan

[21] Appl. No.: 799,165

[22] Filed: Nov. 18, 1985

[30] Foreign Application Priority Data

Nov. 19, 1984 [JP] Japan .................. 59-243760

[51] Int. Cl.$^4$ .............................. B25J 18/00
[52] U.S. Cl. .................. 414/744 A; 414/917; 901/15; 901/48
[58] Field of Search .......... 414/744 R, 744 A, 744 B, 414/744 C, 917, 719; 901/15, 23, 24, 48

[56] References Cited

U.S. PATENT DOCUMENTS 4,341,502  7/1982  Makino ................... 414/744 R
4,507,043  3/1985  Flatau ..................... 901/48 X Primary Examiner—Robert J. Spar
Assistant Examiner—Donald W. Underwood
Attorney, Agent, or Firm—Lowe, Price, LeBlanc, Becker & Shur

[57] ABSTRACT

A direct drive robot based upon a closed loop parallel link arm with a hand mechanism mounted at the outer end thereof has a prime mover for driving the hand mechanism positioned such that mass and position parameters of a specific equation are satisfied by the parallel link arm, whereby interfering forces which would otherwise act between first and second prime movers driving the parallel link arm are eliminated.

2 Claims, 5 Drawing Figures

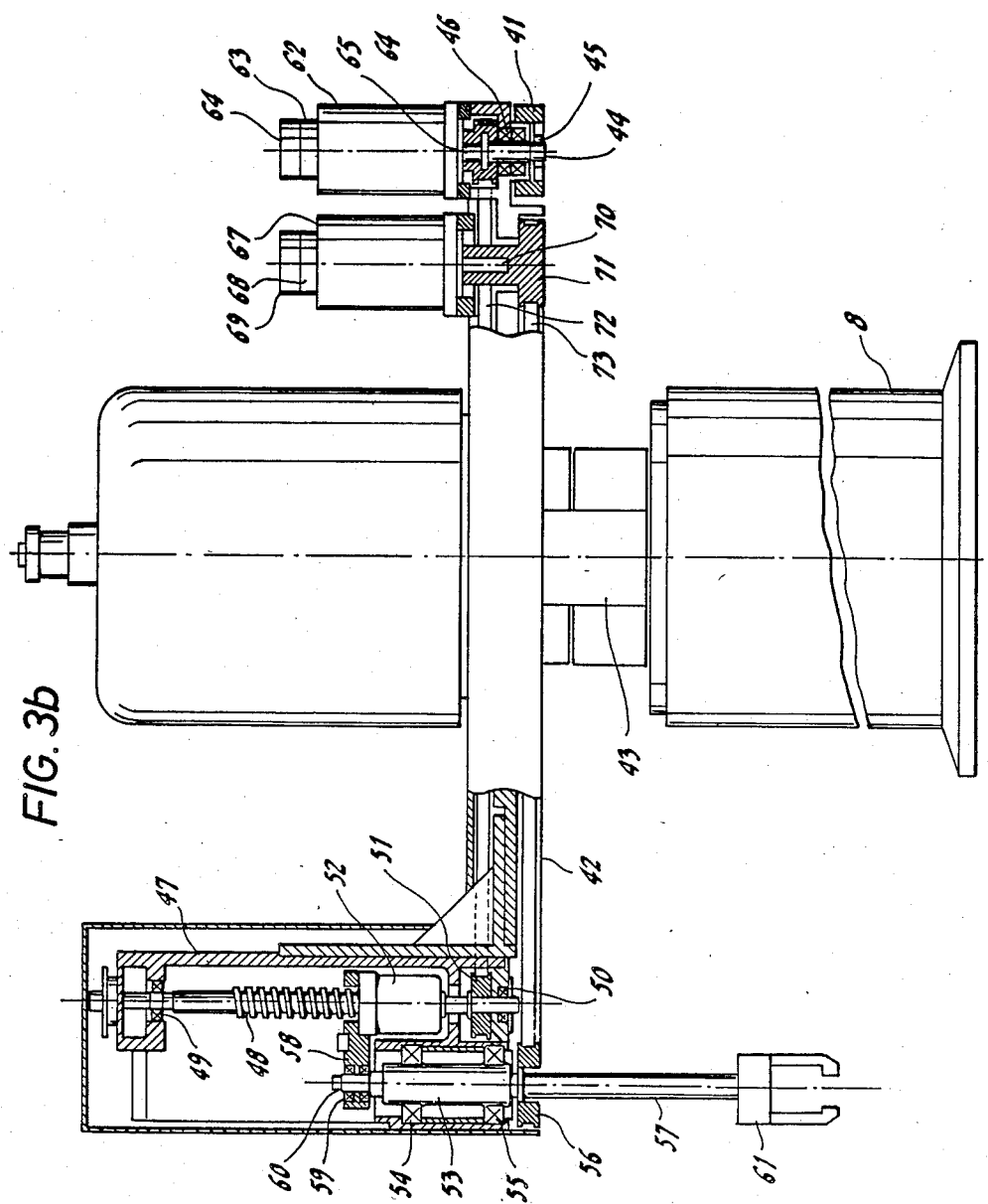

INDUSTRIAL ROBOT EMPLOYING DIRECT DRIVE OPERATION

BACKGROUND OF THE INVENTION

The present invention relates to an industrial robot which employs direct drive operation, whereby an arm carrying a manipulating member is directly driven by motors which are coupled directly thereto, without utilizing an intermediate speed reduction mechanism.

A prior art example of such a direct drive robot is shown in FIG. 1, in which reference numeral 1 denotes a base, with a first arm 2 being rotatably mounted on base 1 at one end of arm 2. A second arm 3 is rotatably mounted at one end thereof on the other end of the first arm 2. A hand mechanism 4, which includes a plurality of drive shafts for producing rotation and vertical displacement of a shaft 4a and a chuck 4b attached thereto, is mounted at the other end of the second arm 3. A first prime mover (not shown in the drawing) is mounted in the base 1, for directly driving the first arm 2 without employing an intermediate speed reduction mechanism. A second prime mover (not shown in the drawing), mounted within the first arm 2, drives second arm 3 to produce movement thereof relative to first arm 2, without employing an intermediate speed reduction mechanism. The robot is operated to move the chuck 4b to a desired position by appropriately controlling each of the prime movers described above.

With such a configuration, reaction forces will be applied acting between the first arm and second arm, due to differences between the respective amounts of angular rotation and levels of angular velocity and angular acceleration of the first arm and second arm. As a result, dynamic fluctuations of the load characteristics of the first prime mover and second prime mover will be produced, and as a result it is difficult to control the operation of the robot precisely, in a desired manner. It is possible to envisage applying compensation control such as to dynamically cancel the reaction forces produced between the first arm and second arm. However such control measures would substantially increase the manufacturing cost of such a robot.

SUMMARY OF THE INVENTION

It is an objective of the present invention to overcome the disadvantages of prior art types of industrial robot employing direct drive operation (abbreviated in the following to direct drive robot) as described above, and to provide a direct drive robot whereby reaction forces acting between the arms due to the reasons discussed above will be cancelled, with such a direct drive robot employing relatively simple control means. In order to attain the desired objectives, a closed loop parallel link arm assembly, made up of four mutually linked arms is employed, and a prime mover which drives a hand mechanism mounted at the outer end of this arm assembly is positioned such as to cancel out any interference forces tending to act between the arms.

More specifically, a direct drive operation robot having a closed loop parallel link arm according to the present invention comprises a base, a supporting pillar fixedly mounted on the base, a first prime mover which is supported by the supporting pillar and includes a drive shaft, a second prime mover which is supported by the supporting pillar and includes a drive shaft which is coaxial with the first prime mover drive shaft, the second prime mover being adapted to be driven independently of the first prime mover, a first arm which is coupled at one end thereof to the drive shaft of the first prime mover, a second arm which is rotatably coupled at one end thereof to the other end of the first arm, a third arm which is rotatably coupled at one end thereof to the other end of the second arm, and a fourth arm which is of identical length to the second arm and which is rotatably coupled at one end thereof to the third arm at a position on the third arm which is at a distance from the coupling position of the second arm and third arm that is equal to the length of the first arm, and which is coupled to a drive shaft of the second prime mover at the other end thereof, the first arm, second arm, third arm and fourth arm being thereby movable in directions parallel to a common fixed plane by selective driving of the first prime mover and second prime mover, a hand mechanism including a plurality of drive shafts, mounted on the third arm at the opposite end of the third arm to the position at which the second arm and third arm are coupled, such that the coupling position of the third arm and fourth arm is disposed between the latter hand mechanism and the coupling position of the second arm and third arm, a controlled member mounted on the hand mechanism for movement relative to the third arm, at least one prime mover which is fixedly mounted on the third arm at a position which satisfies an equation given below, on the opposite end of the third arm to the hand mechanism, and motive power transmission means coupled between the prime mover mounted on the third arm and the hand mechanism, for driving the hand mechanism to produce movement of the controlled member relative to the third arm. The equation referred to above is:

$$m_2 l_1 h_2 \approx m_3 l_2 h_3$$

where $l_1$ is the length of the first arm, $l_2$ is the length of each of the fourth arm and the second arm, $m_1$ is the mass of the first arm, $m_2$ is the mass of the second arm, $m_3$ is the sum of the masses of the third arm, the prime mover which is fixedly attached to the third arm, the hand mechanism and controlled member, and the motive power transmission means, $h_2$ is the distance from the position at which the first arm and second arm are coupled to the position of the center of gravity of the second arm, $h_3$ is the distance from the coupling position of the third arm and fourth arm to the center of gravity of the system consisting of the third arm, the prime mover which is fixedly attached to the third arm, the hand mechanism, and the motive power transmission means, with the distance being measured along the third arm in a direction extending towards the hand mechanism.

BRIEF DESCRIPTION OF THE DRAWINGS

FIGS. 3a, 3b and 3c are a front view in elevation, a side view in elevation and a plan view, respectively, of an embodiment of a direct drive operation robot according to the present invention.

DESCRIPTION OF THE PREFERRED EMBODIMENTS

Figure 1:
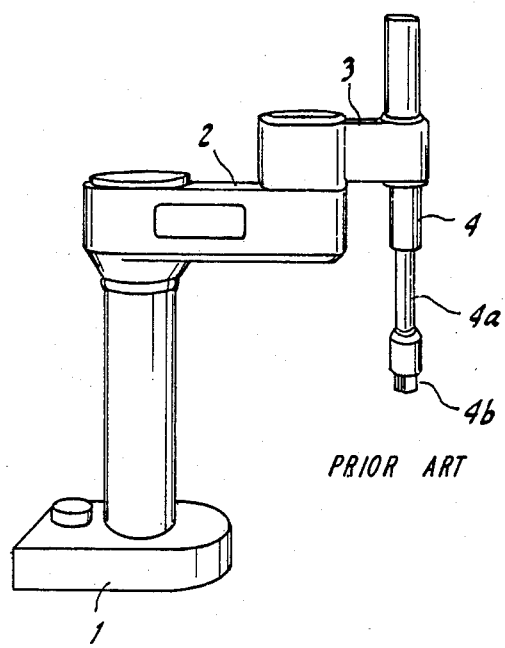
FIG. 1 is an oblique view of a prior art example of a direct drive operation robot.
Figure 2:
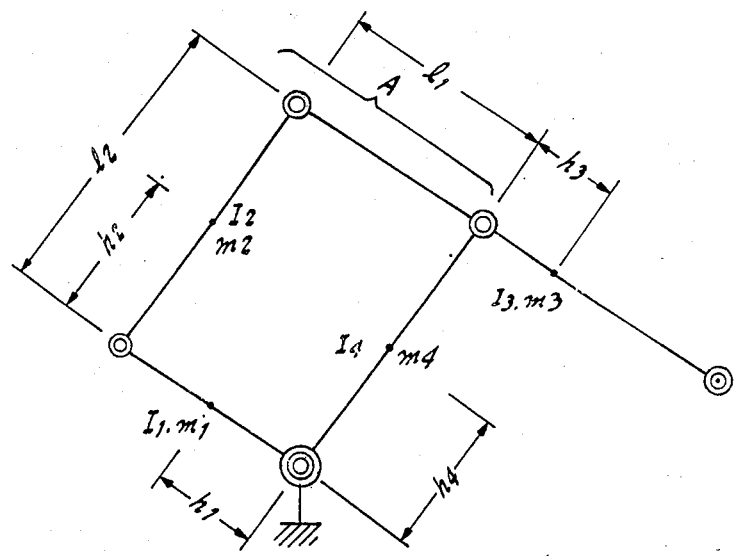
FIG. 2 is a diagram for illustrating the basic principles of an embodiment of a direct drive operation robot according to the present invention.

Referring first to FIG. 2, a diagram is shown to illustrate the positional relationships between various essential components of an embodiment of a direct drive operation robot according to the present invention, which employs a closed loop parallel link arm. As shown, this consists of a first arm which is coupled at one end to a first prime mover to be rotated thereby and is rotatably coupled at the other end thereof to one end of a second arm, the other end of the second arm being rotatably coupled at the other end thereof to a third arm at one end of the third arm, and a fourth arm which is coupled at one end to a second prime mover to be rotated thereby and is rotatably coupled at the other end thereof to a point on the third arm. A controlled member is mounted at the outer end of the third arm, and one or more prime movers for producing movement of that controlled member relative to the third arm are mounted on the third arm at positions within the range denoted as A in FIG. 2, such that the relationship:

$$m_2 l_2 h_2 \approx m_3 l_2 h_3 \quad (1)$$

is satisfied as described hereinabove. As a result, reaction forces acting between the first arm and the fourth arm are eliminated. The manner in which these forces are eliminated will be described in more detail in the following, with reference to the Lagrange motion equations for the basic configuration shown in FIG. 2. These equations are:

$$(m_4 h_4^2 + I_4 + m_2 h_2^2 + I_2 + m_3 l_2^2) \ddot{\theta}_1 + \quad (2)$$
$$\{(m_2 l_1 h_2 - m_3 l_2 h_3)\cos(\theta_1 - \theta_2)\} \ddot{\theta}_2 +$$
$$\{(m_2 l_1 h_2 - m_3 l_2 h_3)\sin(\theta_1 - \theta_2)\} \dot{\theta}_2^2 = Q_1$$

$$(m_1 h_1^2 + I_1 + m_2 l_1^2 + m_3 h_3^2 + I_3) \ddot{\theta}_2 + \quad (3)$$
$$\{(m_2 l_1 h_2 - m_3 l_2 h_3)\cos(\theta_1 - \theta_2)\} \ddot{\theta}_1 +$$
$$[ - (m_2 l_1 h_2 - m_3 l_2 h_3)\sin(\theta_1 - \theta_2)] \dot{\theta}_1^2 = Q_2$$

where the parameters in the above equations (2) and (3) are defined as follows:
- $m_1$: mass of the first arm
- $m_2$: mass of the second arm
- $m_3$: mass of the third arm
- $m_4$: mass of the fourth arm
- $Q_1$: angle of rotation of the fourth arm
- $Q_2$: angle of rotation of the first arm
- $I_1$: moment of inertia of the first arm about the center of gravity thereof
- $I_2$: moment of inertia of the second arm about the center of gravity thereof
- $I_3$: moment of inertia of the third arm about the center of gravity thereof
- $I_4$: moment of inertia of the fourth arm about the center of gravity thereof
- $Q_2$: output torque of the first prime mover
- $Q_1$: output torque of the second prime mover
- $l_1$: length of first arm
- $l_2$: length of second arm and of fourth arm
- $h_1$: distance of the center of gravity of the first arm from the position of coupling of the first prime mover and first arm
- $h_2$: distance of the center of gravity of the second arm from the position of coupling of the first arm and second arm
- $h_3$: distance of the center of gravity of the third arm from the position of coupling of the fourth arm and the third arm
- $h_4$: distance of the center of gravity of the fourth arm from the position of coupling of the fourth arm and the second prime mover.

It should be noted that the terms "length of the first arm" and "length of the second arm", as used herein for brevity of description, are intended to denote the distance between the positions on each arm at which the arm is coupled to an adjacent member.

Reference positions of $h_1$, $h_2 h_3$ and $h_4$ are as shown in FIG. 2. The drive shaft of the first prime mover is coupled directly to the first arm, without an intermediate speed reduction mechanism, and similarly the drive shaft of the second prime mover is coupled directly to the fourth arm, without employing a speed reduction mechanism between these. An output torque $Q_2$ is provided by the first prime mover. In accordance with equations (2) and (3), the second and third terms on the left side of equation (2) represent an interfering inertia force and a centrifugal force respectively, determined by the values of the angular velocity $\dot{\theta}_2$ and angular acceleration $\ddot{\theta}_2$ of the first arm, and these forces will affect the value of the angle of rotation $\theta_1$ of the fourth arm.

As stated hereinabove, this problem can be overcome by positioning a third prime mover, and any other prime movers for producing movement of the controlled member relative to the third arm, upon the third arm at positions which will satisfy equation (1) above, i.e. within the range A indicated in FIG. 2. If this is done, then equations (2) and (3) will become as follows:

$$(m_4 h_4^2 + I_4 + m_2 h_2^2 + I_2 + m_3 l_2^2)\ddot{\theta}_1 = Q_1 \quad (2')$$

$$(m_1 h_1^2 + I_1 + m_2 l_1^2 + m_3 h_3^2 + I_3)\ddot{\theta}_2 = Q_2 \quad (3')$$

Thus, the output torque $Q_2$ of the first prime mover will not affect the angle of rotation $\theta_1$ of the fourth arm. With a direct drive operation robot according to the present invention, therefore, no torque interference occurs between the first arm and first prime mover and the second arm and second prime mover. As a result, the robot can be considered to have linear characteristics with regard to control of its operation, so that control is extremely simple.

Figure 3A:
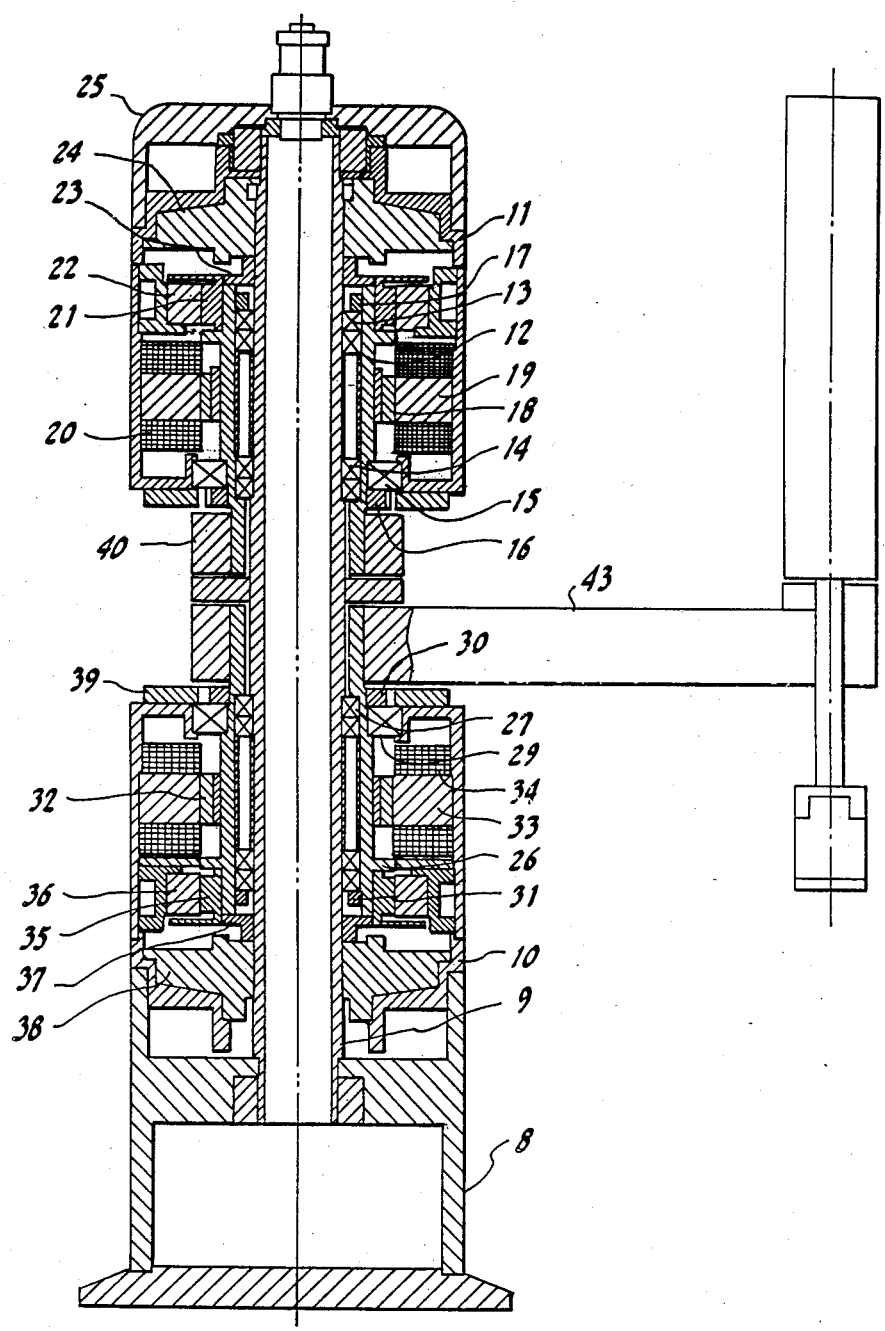
Figure 3C:
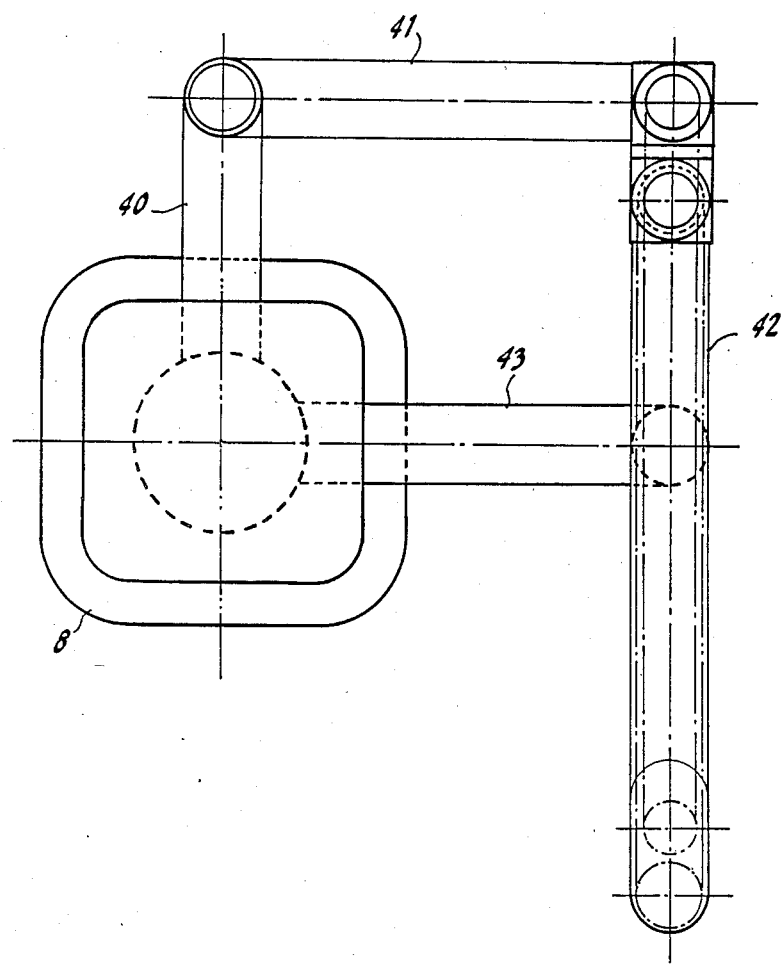

FIGS. 3a, 3b and 3c are views in front elevation, side elevation and plan, respectively of an embodiment of a direct drive operation robot employing a closed loop parallel link arm according to the present invention, based on the principles discussed above. Reference numeral 8 denotes a base which supports the overall weight of the robot, and numeral 9 denotes a supporting pillar which is fixedly mounted on base 8. A housing 10 is fixedly attached to the base 8, while a housing 11 is fixedly attached to the supporting pillar 9. Reference numeral 12 denotes a first prime mover drive shaft which is rotatably mounted with respect to supporting pillar 9 by means of bearings 13 and 14 and is rotatably mounted with respect to the housing 11 by means of a bearing 15, and which is moreover restrained against vertical movement by means of a bearing 15 and stopper rings 16 and 17. Reference numeral 18 denotes a permanent magnet rotor of a first prime mover and is fixedly attached to a first prime mover drive shaft 12, while a first prime mover stator 19 is fixedly attached to the housing 11. A stator coil 20 is mounted on the first prime mover stator 19. The first prime mover drive shaft 12, the first prime mover permanent magnet rotor 18, the first prime mover stator 19 and the first prime mover stator coil 20 are the principal components of a first prime mover.

Reference numeral 21 denotes a permanent magnet rotor of a first tachometer generator which is fixedly attached to the first prime mover drive shaft 12, while a stator 22 of the first tachometer generator is fixedly attached to the housing 11. The first tachometer generator permanent magnet rotor 21 and the first tachometer generator stator 22 are the main components of a first tachometer generator.

Reference numeral 23 denotes a first encoder input shaft which is fixedly attached to the first prime mover drive shaft 12, while numeral 24 denotes a first encoder which is fixedly attached to the housing 11. Numeral 25 denotes an outer cover.

Reference numeral 26 denotes a second prime mover drive shaft which is rotatably mounted with respect to supporting pillar 9 by means of bearings 27 and 28, and which is rotatably mounted with respect to housing 10 by a bearing 29. The drive shaft 26 is restrained against movement in the vertical direction by means of a bearing 29 and stopper rings 30 and 31. A second prime mover permanent magnet rotor 32 is fixedly attached to a second prime mover drive shaft 26. A second prime mover stator 33 is fixedly attached to the housing 10. A stator coil 34 is fixedly mounted on the second prime mover stator 33. The second prime mover drive shaft 26, second prime mover permanent magnet rotor 32, second prime mover stator 33 and second prime mover stator coil 34 are the main components of a second prime mover.

Reference numeral 35 denotes a permanent magnet rotor of a second tachometer generator, which is fixedly attached to the second prime mover drive shaft 26. A second tachometer generator stator 36 is fixedly attached to the housing 10. The second tachometer generator permanent magnet rotor 35 and the second tachometer generator stator 36 are the main components of a second tachometer generator.

Reference numeral 37 denotes an encoder input shaft which is fixedly attached to the second prime mover drive shaft 26, while a second encoder 38 is fixedly attached to the housing 10. Reference numeral 39 denotes an external case.

Reference numeral 40 denotes a first arm which is directly coupled to the first prime mover drive shaft 12, without an intermediate speed reduction mechanism being coupled therebetween. Numeral 41 denotes a second arm, numeral 42 denotes a third arm and numeral 43 denotes a fourth arm. A shaft 44 is fixedly attached to the stopper ring 45 of the second arm, and is rotatably coupled to the third arm 42 by means of a bearing 46. In this way, the first arm 40 is rotatably coupled to the second arm 41, and the third arm 42 is rotatably coupled to one end of the fourth arm 43. The other end of the fourth arm 43 is directly coupled to the drive shaft 26 of the second prime mover, without an intermediate speed reduction mechanism. It should be noted that the second arm 41 and the fourth arm 43 are of identical length, while the distance from the position at which the third arm 42 and the fourth arm 43 are coupled to the position at which the second arm 41 and the third arm 42 are coupled is identical to the length of the first arm 40, and the first arm 40, second arm 41, third arm 42 and fourth arm 43 constitute a parallel quadrilateral closed loop link arm. Reference numeral 47 denotes a hand mechanism supporting member which is fixedly attached to the third arm 42. An externally threaded shaft 48 is rotatably mounted with respect to the hand mechanism supporting member 47, and restrained against movement in the vertical direction, by means of bearings 49 and 50. A belt wheel 51 having teeth formed around the periphery thereof is fixedly attached to the lower end of the externally threaded screw 48. The externally threaded screw 48 meshes in an internally threaded body 52. Reference numeral 53 denotes a hand rotation shaft which is rotatably mounted with respect to the hand mechanism supporting member 47, by means of bearings 55 and 54, and which is restrained against movement in the vertical direction with respect to the hand mechanism supporting member 47. Reference numeral 56 denotes a belt wheel, having teeth formed around the periphery thereof, which is fixedly attached to the hand rotation shaft 53, concentric with shaft 53. A hand shaft 57, which is non-rotatable with respect to shaft 53 and constitutes a controlled member, is slidably mounted with respect to vertical movement along the axis of hand rotation shaft 53, coaxial with shaft 53, while being restrained against rotation relative to hand rotation shaft 53 about their common axis.

Reference numeral 58 denotes a vertical displacement drive member to which the hand shaft 57 is rotatably coupled by a bearing 59, with hand shaft 57 being restrained against vertical movement with respect to vertical displacement drive member 58 by means of a stopper ring 60. The vertical displacement drive member 58 is fixedly attached to the internally threaded body 52. Reference numeral 61 denotes a chuck, which is of solenoid-driven type and is mounted on the lower end of arm shaft 57.

A vertical displacement prime mover 62 is fixedly mounted on the third arm 42, while a tachometer generator 63 serves to detect the speed of rotation of a drive shaft 65 of vertical displacement prime mover 62, and an encoder 64 serves to detect the angle of rotation of drive shaft 65. The drive shaft 65 has a toothed belt wheel 66 fixedly mounted thereon. Reference numeral 67 denotes a rotation drive prime mover which is fixedly mounted on the third arm 42, and a tachometer generator 68 serves to detect the speed of rotation of a drive shaft 70 of rotation drive prime mover 67, while an encoder 69 serves to detect the angle of rotation of drive shaft 70. Drive shaft 70 of rotation drive prime mover 67 has a toothed belt wheel 71 fixedly mounted thereon. A toothed belt 72 is stretched between and around the toothed belt wheels 51 and 66 with a specific degree of tension, to thereby mutually couple these wheels. Similarly, a toothed belt 73 is stretched between and around the toothed belt wheels 56 and 71 with a specific degree of tension, to mutually couple wheels 56 and 71.

The positions at which the vertical displacement prime mover 62 and the rotation drive prime mover 67 are respectively disposed, along a line between the position at which the second arm and third arm are mutually coupled and the position at which the third arm and fourth arm are mutually coupled, are selected such as to satisfy equation (1) above, to thereby eliminate torque interference between the first prime mover and second prime mover.

The operation of this embodiment will now be described. Generally speaking, it is necessary for a planar type of industrial robot to permit arbitrary movement in directions parallel to a fixed plane, together with movement in a direction perpendicular to that fixed plane and also rotational movement, of controlled member such as a shaft or chuck which is mounted on a hand mechanism. Control of positioning of the controlled member of the present embodiment by movement in directions parallel to a horizontal plane is performed by position control of the first prime mover, through feedback of the angle of rotation and angular velocity of the first prime mover drive shaft executed by means of the first tachometer generator and first encoder 24, and position control of the second prime mover, through feedback of the angle of rotation and angular velocity of the drive shaft of the second prime mover which is executed by means of the second tachometer generator and second encoder 38. By applying position control to the first prime mover and second prime mover in this way, the third arm 40, which is directly coupled to the drive shaft of the first prime mover, and the fourth arm 43 which is directly coupled to the drive shaft of the second prime mover, are moved in a controlled manner whereby the third arm 42 is displaced in accordance with the known principles of operation of a quadrilateral link mechanism. In this way, due to the fact that the first prime mover and second prime mover are subjected to mutually independent position control, displacement of hand shaft 57 and chuck 61 to an arbitrary position in a horizontal plane can be performed.

Determination of the vertical position of chuck 61 is performed as follows. Firstly, position control of the drive shaft 65 of prime mover 62 is performed by feedback of the angle of rotation and angular velocity of that drive shaft using tachometer generator 63 and encoder 64. The externally threaded screw 48 is thereby driven through toothed belt 72 and toothed belt wheel 51 to be rotated by a controlled amount, producing a corresponding vertical displacement of the internally threaded body 52 which is engaged therein. Since hand shaft 57 is restrained against vertical movement with respect to body 52, hand shaft 57 and chuck 61 mounted thereon are displaced vertically by an amount which is identical to that of internally threaded body 52. In this way, controlled movement of chuck 61 in the vertical direction is accomplished.

Determination of an amount and direction of rotation of chuck 61 is performed as follows. Position control of the drive shaft 70 of rotation drive prime mover 67 is executed by feedback of the angle of rotation and angular velocity of that drive shaft, employing tachometer generator 68 and encoder 69. A controlled amount of rotation of drive shaft 70 can thereby be produced, which is transferred by toothed belt wheel 71, toothed belt 73, and toothed belt 56 to the hand rotation shaft 53. Since the hand shaft 57 cannot rotate with respect to hand rotation shaft 53, shaft 57 and chuck 61 are thereby rotated by a controlled amount in a specific direction.

It will be apparent that a less complex mechanical arrangement of such a closed loop parallel link arm assembly, with simpler means for transferring motive force to execute vertical and rotation of the chuck, could be achieved if the drive prime movers for producing vertical and rotation of the chuck were to be positioned within the hand mechanism or close thereto, rather than spaced substantially apart from the hand mechanism as in the above embodiment. However, if this were to be done, i.e. by positioning the rotation and vertical displacement drive prime movers close to the outer end of third arm 42, the distance $h_3$ from the center of gravity of the third arm 42 to the position at which third arm 42 is coupled to the fourth arm 43 would be substantially increased, by comparison with the value of $h_3$ which is provided by positioning the rotation and vertical displacement drive prime movers in accordance with the described embodiment of the invention. As a result, equation (1) above would not be satisfied, specifically;

$$m_2 l_1 h_2 < m_3 l_2 h_3$$

In this case, in order to reduce the value of distance $h_3$, in order to satisfy equation (1) and hence eliminate interfering forces from acting between the first arm 40 and third arm 43, it would be necessary to increase the mass $m_2$ of the second arm 41, or to increase the length $l_1$ of the first arm 40, or to increase the distance $h_2$ of the center of gravity of the second arm from the coupling position of the second arm and first arm, shown in FIG. 2. However each of these measures would result in an increase in the overall size of the closed loop parallel link arm or in an increase in the overall mass thereof, and would thereby increase the level of load placed on the prime movers.

With the embodiment of the present invention described hereinabove, the prime movers which perform vertical and rotational movement of the chuck are positioned between the position of coupling of the second arm and third arm and the position of coupling of the second arm and fourth arm, to thereby satisfy equation (1) above. As a result, the closed loop parallel link arm of this embodiment can be made more compact than would be the case if these vertical and rotation prime movers were to be mounted close to the hand mechanism. In addition, interfering forces acting between the first arm and fourth arm are eliminated, and the load placed upon the prime movers reduced.

In the embodiment described above, rotational movement of the first, second, third and fourth arms in a horizontal direction is produced by operation of the first prime mover and second prime mover, with perpendicular movement of the chuck being produced by the operation of the prime mover (termed the vertical displacement prime mover) which produces movement of the chuck along the direction of the axis of rotation thereof. However the invention is equally applicable to a direct drive operation robot for which the arms are rotated in a direction which is other than horizontal, i.e. in which each point of the arms rotates in a fixed plane which is not horizontal. Thus, more generally speaking, the vertical displacement prime mover 62 produces movement of the controlled member, i.e. chuck 61, in a direction which is perpendicular to the plane of rotation of any point on the arms 40 to 43 constituting the closed loop parallel link arm.

It should be noted that the term "coupling position" as used hereinabove and in the appended claims is intended to signify the position of an axis of rotation common to two members which are mutually rotatably coupled, or an axis about which one member is rotated by another member, as viewed perpendicular to a plane of rotation.

Although the present invention has been described in the above with reference to a specific embodiment, it should be noted that various changes and modifications to the embodiments may be envisaged, which fall within the scope claimed for the invention as set out in the appended claims. The above specification should therefore be interpreted in a descriptive and not in a limiting sense.

What is claimed is:

1. A direct drive operation robot having a closed loop parallel link arm, comprising:
 a base;
 a supporting pillar fixedly mounted on said base;
 a first prime mover which is supported by said supporting pillar and includes a drive shaft;
 a second prime mover which is supported by said supporting pillar and includes a drive shaft which is coaxial with said first prime mover drive shaft, said second prime mover being adapted to be driven independently of said first prime mover;
 a first arm which is directly coupled at one end thereof to said drive shaft of said first prime mover, a second arm which is rotatably coupled at one end thereof to the other end of said first arm, a third arm which is rotatably coupled at one end thereof to the other end of said second arm, and a fourth arm which is of identical length to said second arm and which is rotatably coupled at one end thereof to said third arm at a position on said third arm which is at a distance from said coupling position of said second arm and third arm that is equal to said length of said first arm, and which is directly coupled to said drive shaft of said second prime mover at the other end thereof, said first arm, second arm, third arm and fourth arm being thereby rotatable in directions parallel to a fixed plane by selective driving of said first prime mover and second prime mover;
 a hand mechanism including a plurality of drive shafts, mounted on said third arm at the opposite end of said third arm to said position at which said second arm and third arm are coupled, such that said coupling position of said third arm and fourth arm is disposed between said hand mechanism and said coupling position of said second arm and third arm;
 a controlled member mounted on said hand mechanism for movement relative to said third arm;
 at least one prime mover which is fixedly mounted on said third arm at a position which satisfies an equation given below, at a position on the opposite end of said third arm to said hand mechanism, and;
 motive power transmission means coupled between said prime mover mounted on said third arm and said hand mechanism, for driving said hand mechanism to produce movement of said controlled member relative to said third arm; in which said equation is:

$$m_2 l_1 h_2 \approx m_3 l_2 h_3$$

where $l_1$ is the length of said first arm, $l_2$ is the length of each of said fourth arm and said second arm, $m_1$ is the mass of said first arm, $m_2$ is the mass of said second arm, $m_3$ is the sum of the masses of said third arm, said prime mover which is fixedly attached to said third arm, said hand mechanism and controlled member, and said motive power transmission means, $h_2$ is the distance from the position at which said first arm and second arm are coupled to the position of the center of gravity of said second arm, $h_3$ is the distance from the coupling position of said third arm and fourth arm to the center of gravity of the system consisting of said third arm, said prime mover which is fixedly attached to said third arm, said hand mechanism, and said motive power transmission means, with said distance being measured along said third arm in a direction extending towards said hand mechanism.

2. A direct drive operation robot according to claim 1, in which said at least one prime mover mounted on said third arm and said motive power transmission means coupled thereto comprise:
 a third prime mover having a drive shaft, and a motive power transmission mechanism coupled between said drive shaft of said third prime mover and one of said drive shafts of said hand mechanism, for producing movement of said controlled member relative to said third arm in a direction perpendicular to said fixed plane of movement of said first arm, second arm, third arm and fourth arm, and;
 a fourth prime mover having a drive shaft, and a motive power transmission mechanism coupled between said drive shaft of said fourth prime mover and one of said drive shafts of said hand mechanism, for producing rotation of said controlled member relative to said third arm.

* * * * *